United States Patent

Kramer et al.

[11] Patent Number: 5,094,678
[45] Date of Patent: Mar. 10, 1992

[54] HIGH-CONVECTION GAS JET NOZZLE SECTION FOR SHEET-LIKE MATERIAL GUIDED OVER ROLLS AND METHOD OF USING SAME

[75] Inventors: Carl Kramer; Klaus Berns, both of Aachen, Fed. Rep. of Germany

[73] Assignee: WSP Ingenieurgesellschaft Fur Warmetechnik, Stromungstechnik U Prozesstechnik Mit Beschrankter Haftung, Aichon, Fed. Rep. of Germany

[21] Appl. No.: 646,035

[22] Filed: Jan. 28, 1991

[30] Foreign Application Priority Data

Jan. 29, 1990 [DE] Fed. Rep. of Germany ....... 4002546

[51] Int. Cl.⁵ .............................................. C03B 27/04
[52] U.S. Cl. ........................................ 65/104; 65/273; 65/348
[58] Field of Search .................................. 65/348-351, 65/182.2, 288, 273, 104

[56] References Cited

U.S. PATENT DOCUMENTS

| | | | |
|---|---|---|---|
| 3,353,946 | 11/1967 | McMaster | 65/348 |
| 3,404,974 | 10/1968 | Belentepe et al. | 65/348 X |
| 3,595,636 | 7/1971 | Posney | 65/348 X |
| 4,323,385 | 4/1982 | Gintert et al. | 65/351 |
| 4,773,926 | 9/1988 | Letemps et al. | 65/351 |

FOREIGN PATENT DOCUMENTS 0114168 1/1983 European Pat. Off. .
2827757 1/1980 Fed. Rep. of Germany .
2256087 6/1982 Fed. Rep. of Germany .
3150859 3/1983 Fed. Rep. of Germany .

Primary Examiner—Robert L. Lindsay
Attorney, Agent, or Firm—Armstrong, Nikaido, Marmelstein, Kubovcik & Murray

[57] ABSTRACT

A high-convection gas jet nozzle section for a sheet-like material guided over rollers, in particular for thermal prestressing or tempering of thin flat glass sheets, comprises a lower nozzle field having nozzle ribs disposed centrally parallel between the rollers and provided with nozzle apertures and an upper nozzle field of which the nozzle ribs provided with nozzle apertures are arranged symmetrically to the vertical axis of each respective lower nozzle rib; the nozzle bottoms of the upper nozzle ribs have the cross-section of a letter "M" extended by a center strip; the width of the nozzle bottom of the upper nozzle ribs is greater than the horizontal distance between the rollers and smaller than the roller pitch; the center strip and the two upwardly tilted inner legs of the upper nozzle bottoms are provided with nozzle apertures; and the smallest distance of the upper nozzle ribs from the upper side of the material is greater than the smallest distance of the lower nozzle ribs from the lower side of the material; the downwardly directed outer legs of the upper nozzle bottoms constrict the downflow region for the gas emerging from the nozzle apertures of the upper nozzle ribs on either side of the upper nozzle ribs, giving as a whole a very symmetrical gas action on the material from above and below.

25 Claims, 6 Drawing Sheets

HIGH-CONVECTION GAS JET NOZZLE SECTION FOR SHEET-LIKE MATERIAL GUIDED OVER ROLLS AND METHOD OF USING SAME

BACKGROUND OF THE INVENTION

1. Field of the Invention

The invention relates to a high-convection gas jet nozzle section for sheet-like material guided over rollers, in particular for the thermal tempering of thin flat glass sheets, comprising a lower nozzle field having nozzle ribs which are arranged centrally and parallel to each other or parallel to the rollers between the rollers and are provided with nozzle apertures, and an upper nozzle field of which the nozzle ribs provided with nozzle apertures are arranged symmetrically to the vertical axis of the opposite lower nozzle ribs.

2. Description of the Prior Art

Using such high-convection gas jet nozzle sections or lines the sheet-like material guided over the rollers, for example a metal plate, a strip of metal, plastic, fibres, textiles or sections of such materials, can be heated or cooled.

Particularly advantageous is the use of such a high-convection gas jet nozzle section as cooling section for thermal toughening or tempering of thin flat glass sheets led over rollers because in this case on the one hand particularly high heat transfers must be achieved and on the other the glass sheets must not be lifted from the roller path, i.e. in spite of the rollers at the lower side of the glass influencing the flow at the glass sheet almost equalizing pressure distributions must arise at the glass upper and lower side even with very intense blasting of the glass sheet.

The heat transfer coefficient to be obtained in a cooling section for thermal tempering of glass is approximately inversely proportional to the glass thickness. Usually, the heat transmission is ensured by blowing air onto the glass sheet heated to its softening temperature, the air coming from a nozzle system which is supplied by a fan. With this type of heat transfer the heat transfer coefficient increases only with about the 0.7th power of the nozzle exit velocity. The flow power necessary for this purpose however increases with the third power of the nozzle exit velocity. Thus, if for example in a cooling section glass having a thickness of 3 mm instead of a thickness of 5 mm is tempered, then for this purpose the nozzle exit velocity would have to be increased by about 2.1 times and the flow power by 9 times in order to achieve the same heat transfer.

In the present state of the art, such an increase in the power is the usual method of extending the range of use of a cooling section for tempering glass for small glass thicknesses. Thus, in industrially operated cooling sections for tempering planar 3 mm thick glass sheets nozzle pressures of 20000 to 22000 pa are used.

However, due to these high pressures, for thin glass sheets whose weight decreases linearly with the thickness and whose stiffness decreases with the third power of the thickness additional difficulties are encountered in the guiding of the glass sheet over rollers. For to achieve adequate planarity, it would be necessary for both the high heat transfer and the pressure forces to be of equal magnitude at the upper and lower sides of the glass sheets led over rollers. However, at the lower side the pressure action and heat transmission is impaired by the rollers. Nevertheless, in accordance with the prior art at the upper and lower sides the same nozzle field is used for blasting the glass sheets, the necessary difference in the heat transfer being compensated by different operating pressures for the upper and lower nozzle fields. Since the rollers dam up the flow at the lower side, the pressure at the lower side must be increased with respect to the pressure at the sheet upper side to compensate the heat transfer difference caused thereby. With thick sheets this pressure difference can be compensated by the comparatively high weight of the sheet or pane so that in spite of a pressure difference adequate guiding of the sheet by the rollers is provided. However, with thin sheets the necessary substantially higher nozzle pressure at the lower side and the resulting pressure differential force directed from below upwardly lead to lifting of the sheets from the roller group and thus to considerable production disturbances, if indeed tempering of thin glass is possible at all with such apparatus.

As a remedy for this problem, between the upper nozzle ribs dummy rollers, for example cylindrical tubes, are located which generate a dam effect for the tempering air applied to the sheet similar to that caused by the rollers beneath the sheet. Since however these dummy rollers, in contrast to the rollers themselves, do not contact the surface of the sheet but must be held at a certain minimum distance above the glass surface, the flow fields and thus the pressure fields, and consequently finally the heat transfer differ at the upper and lower side of the glass disc to such a considerable extent that with such apparatuses a sheet safety glass with thicknesses below 3.2 mm can be made only with considerable restrictions as regards the demands on optical quality and the fracture pattern. German patent 3,150,859 (corresponding to U.S. Pat. No. 4,586,946) discloses a nozzle system having nozzle ribs which are adapted to the form of an arched glass disc and from which gas jets are directed both vertically and also inclined onto the arched glass disc. Above and below the glass sheets or discs the same nozzle ribs are employed, the influence of the rollers on the flow behaviour described above being compensated by throttle rods arranged between the upper nozzles. However, as practical experience has shown with such a constructional form relatively great differences still occur in the heat transfer at the upper and lower sides of the glass sheet.

Furthermore, German patent 2,256,087 discloses an apparatus for drying a web of material having a nozzle system generating jets which without exception impinge inclined on the material web; the blast direction of each nozzle hole row, starting from the nozzle box centre and with respect to the material web, is at a progressively smaller blast angle from hole row to hole row; in addition, the clear distance from the material web at each nozzle hole row becomes stepwise greater than at the preceding nozzle hole row progressively starting from the nozzle box centre towards the two nozzle box edges. This nozzle developed for the drying art is specifically designed for avoiding thin relatively sensitive material webs to be dried lifting off the support on which they are guided. For this reason, a jet inclination angle of 15° to 45° can also be accepted. However, with such large jet inclination angles it is not possible to obtain the extremely high heat transfer required for example for tempering thin safety glass sheets or panes.

SUMMARY OF THE INVENTION

The invention therefore has as its object the provision of a high-convection gas jet nozzle section of the type referred to above in which the aforementioned disadvantages do not occur. In particular, a nozzle section is to be proposed in which even without using dummy rollers the same heat transfer and the same pressure action at the upper and lower sides of the material is obtained.

The invention therefore proposes in a high-convection gas jet nozzle section for sheet-like material guided over rollers, in particular for the thermal tempering of thin flat glass sheets, comprising a lower nozzle field having nozzle ribs which are arranged centrally and parallel to each other or parallel to the rollers between the rollers and are provided with nozzle apertures, an upper nozzle field of which the nozzle ribs provided with nozzle apertures are arranged symmetrically to the vertical axis of the opposite lower nozzle ribs, the gas jets from some nozzle apertures perpendicularly and the gas jets from other nozzle apertures impinging obliquely on the surface of the material, the improvement in which the nozzle bottoms of the upper nozzle ribs have the cross-section of a letter "M" extended by a center strip, the width of the nozzle bottoms of the upper nozzle ribs is greater than the horizontal distance between the rollers and smaller than the roller pitch, the center strip and the two upwardly tilted inner legs of the extended M cross-section of the nozzle bottoms are provided with nozzle apertures and the smallest distance of the upper nozzle ribs from the upper side of the material is greater than the smallest distance of the lower nozzle ribs from the lower side of the material.

Expedient embodiments of such a high-convection gas jet nozzle section are defined by the features of the subsidiary claims.

The advantages achieved with the invention are due to the fact that the desired high heat transfer is achieved by a nozzle field which is substantially finer and more filigrane than in conventional tempering nozzle systems with as uniform as possible action on the entire glass surface. The nozzle ribs at the upper side of the material are formed in such a manner that they cause the same heat transfer and the same pressure action on the material as the nozzle ribs provided at the lower side of the material, the flow behaviour of which and thus also the heat transfer is influenced by the rollers arranged therebetween. This uniform heat transfer at the upper and lower sides of the material is achieved in that the nozzle jets all impinge with substantially the same arrival velocity on the surface of the material. For this purpose, inclined jets having a jet path up to the point of impact on the surface which is greater must be provided with a greater diameter. These greater diameters and the resulting greater volume flow make it necessary to change the nozzle pitch for these nozzle jets of greater diameter.

The retaining or dam action of the rollers at the lower side of the material is compensated by the form of the nozzle ribs at the upper side of the material without having to employ for this purpose the otherwise usual dummy rollers at the upper side of the material. This is also promoted by the downwardly directed outer legs of the M-shaped cross-section of the nozzle bottoms of the upper nozzle ribs which constrict the flowoff region for the gas emerging from the nozzle bores of the upper nozzle ribs on either side of the upper nozzle ribs and thereby ensure a defined impinging pattern on the upper side of the material.

With the nozzle fields according to the invention the jets from the center nozzle aperture rows strike the surface to be blasted vertically whilst the jets from the outer nozzle aperture rows, the bores of which are formed in only slightly upwardly inclined surfaces, impinge on the surface to be blasted with a relatively large angle. By the respective mutually offset arrangement of the nozzle apertures in the outer and inner nozzle aperture rows a clearly defined impinging pattern of the nozzle jets on the surface to be blasted is achieved. As a result, between every two nozzle ribs, i.e. exactly above the rollers, a well-defined retention zone is formed in which the treatment gas blown onto the surface due to the equilibrium of the oppositely directed pulse streams detaches from the surface and flows back through the gap between two nozzle ribs. This orderly backflow is thus achieved without a covering with perforated metal sheet between two adjacent nozzle ribs as is known fundamentally from German patent 2,256,087.

BRIEF DESCRIPTION OF THE DRAWINGS

The invention will be described in more detail hereinafter with reference to examples of embodiment with the aid of the attached schematic drawings, wherein.

DESCRIPTION OF THE PREFERRED EMBODIMENTS

Figure 1:
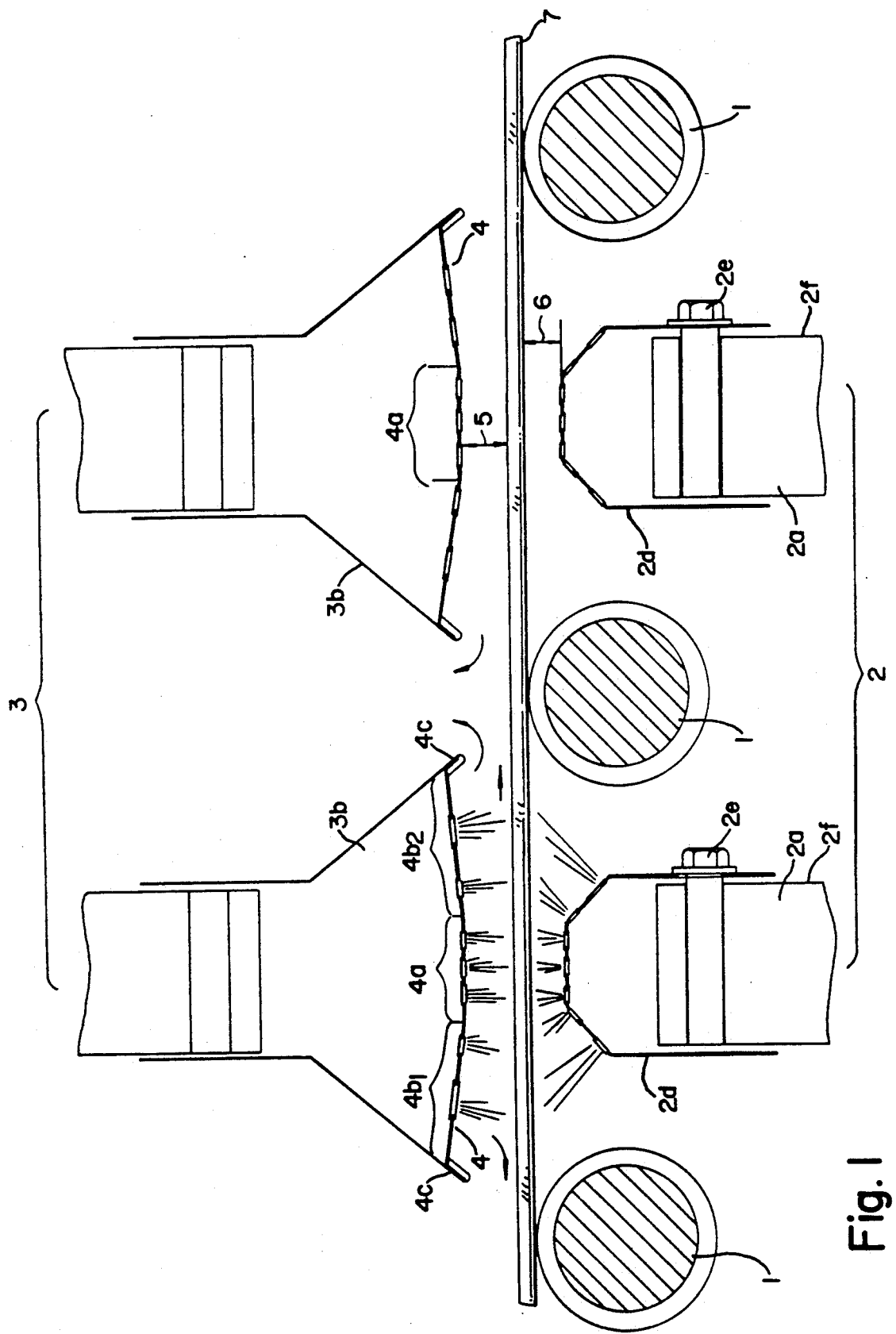
FIG. 1 shows a longitudinal section through part of a cooling section for tempering glass panes or sheets with the upper and lower nozzle ribs and the support rollers for the glass sheet.

FIG. 1 shows in longitudinal section part of a high-convection gas jet nozzle section as cooling and thus tempering section for plane or flat glass sheets 7 led over rollers 1. Between the rollers 1 the nozzle ribs 2a of the lower nozzle field 2 are disposed, i.e. said nozzle ribs 2a of the lower nozzle field 2 blow onto the free lower side of the glass sheet 7 between the rollers 1.

The nozzle ribs 3b of the upper nozzle field 3 are arranged above the glass sheet 7 exactly above the lower nozzle ribs 2a and blow onto the upper side of the glass sheet 7. The distance of the lower nozzle ribs 2a from the glass surface is preferably between 4 mm and 12 mm whilst the distance of the upper nozzle ribs 3b from the surface of the glass may be substantially twice as great, i.e. should lie in the range between 8 mm and 24 mm.

The rollers 1 comprise the core shown in the drawings, as a rule a metal core or a metal tube which is enclosed by a band of material ("bandaged") which withstands the relatively high temperature of the glass sheet 7. Possible material for example is the aromatic polyamide sold under the trademark "Kevlar"; however, other high-temperature-resistant materials from which strips or bands can be made may be employed.

Instead of such a bandage the solid cores of the rollers 1 may also be provided with rings. For this purpose, in particular the drawing on of the O rings of the fluorine rubbers sold under the name "Viton" or the use of rings of silicate fibrous material, for example calcium silicate fibrous material, has proved suitable.

Figure 2A:
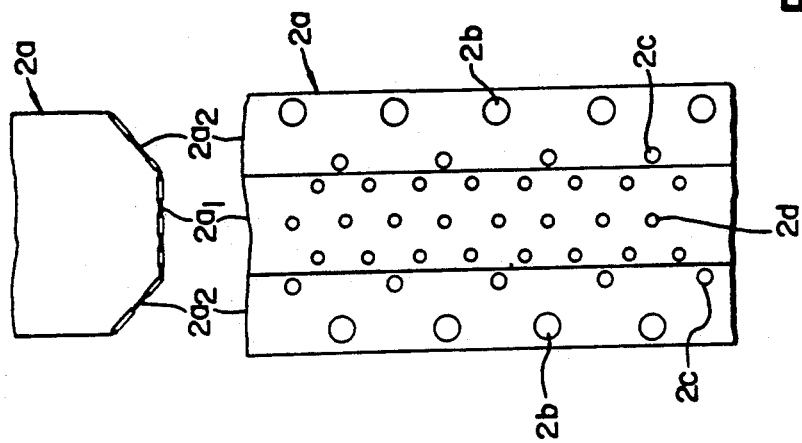
FIG. 2A is a development of the lower nozzle rib according to the FIG. 1 from which the arrangement and the diameter of the nozzle apertures can be seen for the lower nozzle rib.

As is apparent from the illustration of the lower nozzle ribs $2a$ in FIG. 1 and FIG. 2A, said ribs have the usual nozzle cap form with a centre region $2a_1$ which extends parallel to the transport plane and is followed on either side by an inclined region $2a_2$ ("hipped roof"). The nozzle apertures are distributed in size amongst the three regions, the largest nozzle apertures $2b$ being located at the outer edge of the inclined regions $2a_2$; as can be seen in FIG. 2A, a row of nozzle apertures $2b$ of relatively large diameter is arranged in said edge region.

The next inwardly disposed row of nozzle apertures $2c$ has a smaller diameter whilst in the center region $2a_1$ only nozzle apertures $2d$ of the smallest diameter of the three different nozzle aperture sizes are disposed.

The nozzle bottom of the upper nozzle ribs $3b$ has in side elevation the form of an elongated letter "M" having an additional center strip $4a$; proceeding from this centre strip $4a$, which extends substantially parallel to the transport plane of the glass sheet 7, the two adjoining legs $4b_1$ and $4b_2$ of the nozzle bottom 4 extend somewhat upwardly to the edge at which the nozzle bottom is terminated by downwardly directed outer legs $4c$. Said legs $4c$ constrict the downflow region for the gas emerging from the nozzle bores of the upper nozzle ribs $3b$ on either side of said upper nozzle ribs $3b$ so that the gas flowing back there is deflected as indicated by the flow arrows in FIG. 1.

As can be seen in 2B, a row of nozzle apertures $4d$ of the largest diameter of all nozzle apertures is located in the upper nozzle ribs $3b$ in the inclined regions $4b_1$ or $4b_2$, substantially in the center of said regions. A second row of nozzle apertures $4e$ of smaller diameter is located at the inner edge of the inclined regions $4b_1$ or $4b_2$ whilst nozzle apertures $4f$ of the smallest diameter are formed in the center strip $4a$.

In FIG. 1 the jet directions of the gas jets emerging from the various nozzle apertures are also illustrated; as can be seen, the gas jets emerging from the respective center regions of the nozzle ribs impinge substantially perpendicularly on the glass sheet 7 whilst the gas jets coming from the edge regions are inclined to different extents, the gas jets coming from the lower nozzle ribs $2a$ being inclined to a greater extent than the gas jets coming from the lateral legs of the upper nozzle ribs $3b$.

Since when using nozzles with the filigrane nozzle fields thus generated a fairly accurate positioning of the upper nozzle bottoms 4 with respect to the nozzle caps $2d$ of the lower nozzle ribs $2a$ is important, the nozzle ribs are not made from one piece as weld structure but instead the nozzle caps $2d$ of the lower nozzle ribs $2a$ are secured with the aid of the screw connection $2e$ shown in FIG. 1 displaceably to the body parts $2f$ of the nozzle ribs $2a$ so that on assembly production tolerances can be compensated; this contributes to being able to bring the action patterns of the upper nozzle field 3 and the lower nozzle field 2 into fairly accurate coincidence.

Figure 2B:
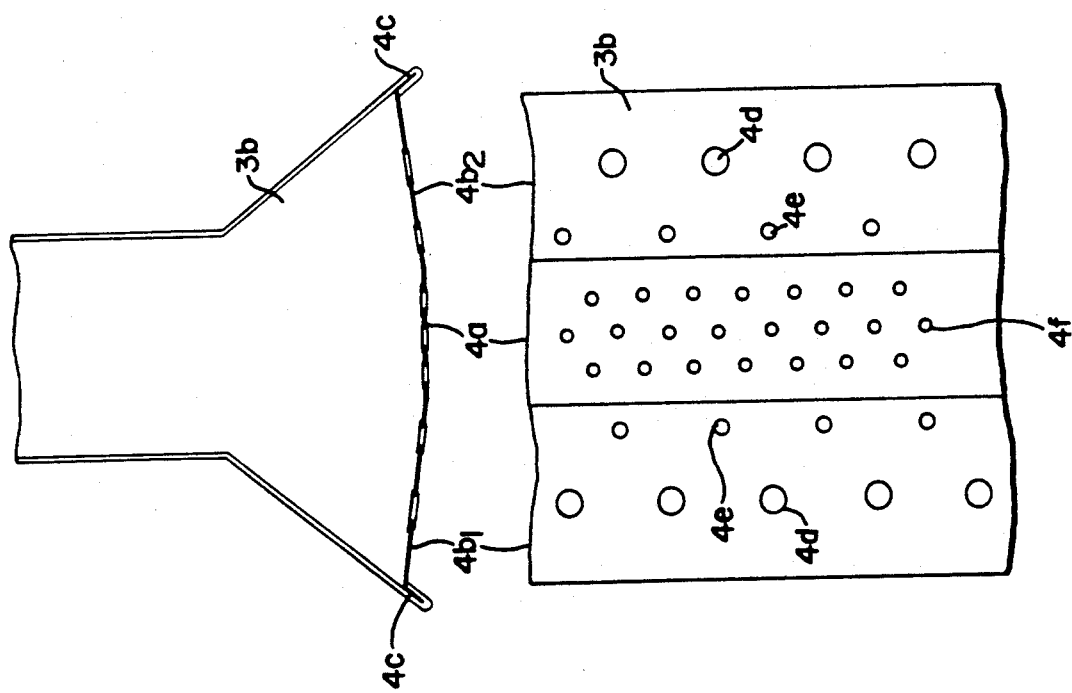
FIG. 2B is a development of the upper nozzle rib of FIG. 1 from which the arrangement and diameter of the nozzle apertures can be seen for the upper nozzle rib.

FIGS. 2A and 2B show a development of those areas of the nozzle ribs $2a$ and $3b$ in which the nozzle apertures are formed, that is the nozzle bottoms 4 on the one hand and the nozzle caps $2d$ on the other. As can be seen, the diameters of the nozzle apertures $2b$, $2c$ and $2d$ or $4d$, $4e$ and $4f$ and the pitch of the rows of nozzle apertures increase in each case outwardly starting from the center of a nozzle rib. The inner rows of nozzle apertures are each offset half a pitch with respect to each other. The pitch of the outer rows of nozzle apertures is chosen to correspond to the greater diameter of the nozzle apertures due to the greater jet travel. The distance between the individual rows of nozzle apertures for the nozzle bottom 4 of the upper nozzle rib $3b$ shown in FIG. 2B is greater than in the lower nozzle rib $2a$ in accordance with the form of the nozzle bottom different from said lower nozzle rib $2a$.

As can be seen from FIG. 1, the width of the nozzle bottom 4 of the upper nozzle ribs $3b$ is greater than the horizontal distance between the rollers 1 and less than the roller pitch so that the downwardly directed legs $4b_1$ and $4b_2$ are above the rollers 1 whereas the central regions $2a_1$ and $4a$ of the respective nozzle bottoms lie directly opposite each other.

The smallest distance of the upper nozzle ribs $3b$ from the upper side of the glass sheet, indicated in FIG. 1 by the reference numeral 5, is greater than the smallest distance of the lower nozzle ribs $2e$ from the lower side of the glass sheet 7, indicated in FIG. 1 by the reference numeral 6.

To take account of the objective of achieving as uniform as possible an action and thus equal heat transfers at the upper and lower sides of the glass sheet 7, the following dimensions should be employed for the nozzle ribs $2a$ and $3b$:

If the total width of the lower nozzle ribs $2a$ is denoted by BU, the width BP of the substantially planar center strip $4a$ of the upper nozzle bottoms 4 should lie within the following limits:

$$0.5 \, BU < BP < 0.75 \, BU$$

The tilt angle of the two legs $4b_1$ and $4b_2$ of the upper nozzle bottoms 4, i.e. the angle at which the two legs $4b_1$ and $4b_2$ extend upwardly from the horizontal center strip $4a$, should lie in the range from 5° to 10°.

With respect to the total width BU of the lower nozzle ribs $2a$ the width BK of each of the two inner tilted legs $4b_1$ and $4b_2$ of the nozzle bottoms 4 of the upper nozzle ribs $3b$ should lie in the following limits:

$$0.6 \, BU < BK < 0.9 \, BU.$$

The inclination of the two downwardly tilted outer legs $4c$ of the nozzle bottoms 4 of the upper nozzle ribs $3b$ to the horizontal should be between 40° and 50°, in particular about 45°.

Finally, with respect to the total width BU of the lower nozzle ribs $2a$ the width BR of each of the two downwardly tilted outer legs of the nozzle bottoms 4 should lie in the following limits:

$$0.1 \, BU < BR < 0.25 \, BU.$$

To obtain a symmetrical application pattern the plane center strip $4a$ of the upper nozzle bottoms 4 has an odd number of rows of nozzle apertures $4f$ of relatively small hole pitches; the rows of the nozzle apertures have a spacing of about 1 hole pitch from each other and are mutually offset by half a hole pitch in the longitudinal direction. The upwardly inclined regions $4b_1$ and $4b_2$ of the nozzle bottoms 4 have further rows of nozzle apertures of larger diameter and larger hole pitch, the diameters and/or the hole pitch increasing with the ordinal number of the rows of the nozzle apertures from the inside to the outside.

Good results are achieved if the center strips $4a$ of the upper nozzle bottoms 4 have three rows of nozzle apertures and the two adjoining upwardly inclined regions $4b_1$ and $4b_2$ each have two rows of nozzle apertures with twice the hole pitch.

In an implemented embodiment the following relationships gave good results: The width BP of the center strip $4a$ is 0.67 times the total width BU of the lower nozzle ribs $2a$; the tilt angle of the two legs $4b_1$ and $4b_2$ is 8°; the width BK of the two legs $4b_1$ and $4b_2$ is 0.8 times the total width BU; the width BR corresponds to 0.14 times the total width BU.

In accordance with the illustration of FIG. 2B the upper nozzle bottoms 4 here comprise a center strip $4a$ having three rows of nozzle apertures $4f$ and adjoining upwardly inclined legs $4b_1$ and $4b_2$ each with two rows of nozzle apertures $4d$ and $4e$ with respectively decreasing diameter and with twice the hole pitch.

By corresponding selection of the positioning of the nozzle apertures, diameters of the nozzle apertures and inclination angles of the nozzle jets, an impingement pattern can be generated at the lower side of the glass sheet 7 which is a mirror reflection of that at the upper side of the glass sheet 7.

In the embodiments shown in FIGS. 1 and 2 the geometrical exit area of the nozzle apertures related on one side to the blasted area is about 2% to 5%; the exit area of the nozzle apertures should be identical for the upper and lower ribs $3b$ and $2a$.

It has been found expedient for the percentage area of the nozzle apertures to decrease in the passage direction of the nozzle section or line. The pitch of the rollers 1 and nozzle ribs $2a$ and $3b$ should lie in the range of 60 mm to 150 mm.

As apparent from the right part of FIG. 1, the nozzle gaps $2d$ of the lower nozzle ribs $2a$ are inclined in the manner of a hipped roof and screwed ($2e$) to the bodypart $2f$, both the horizontal center region $2a_1$ and the two inclined edge regions $2a_2$ having nozzle apertures.

Figure 3:
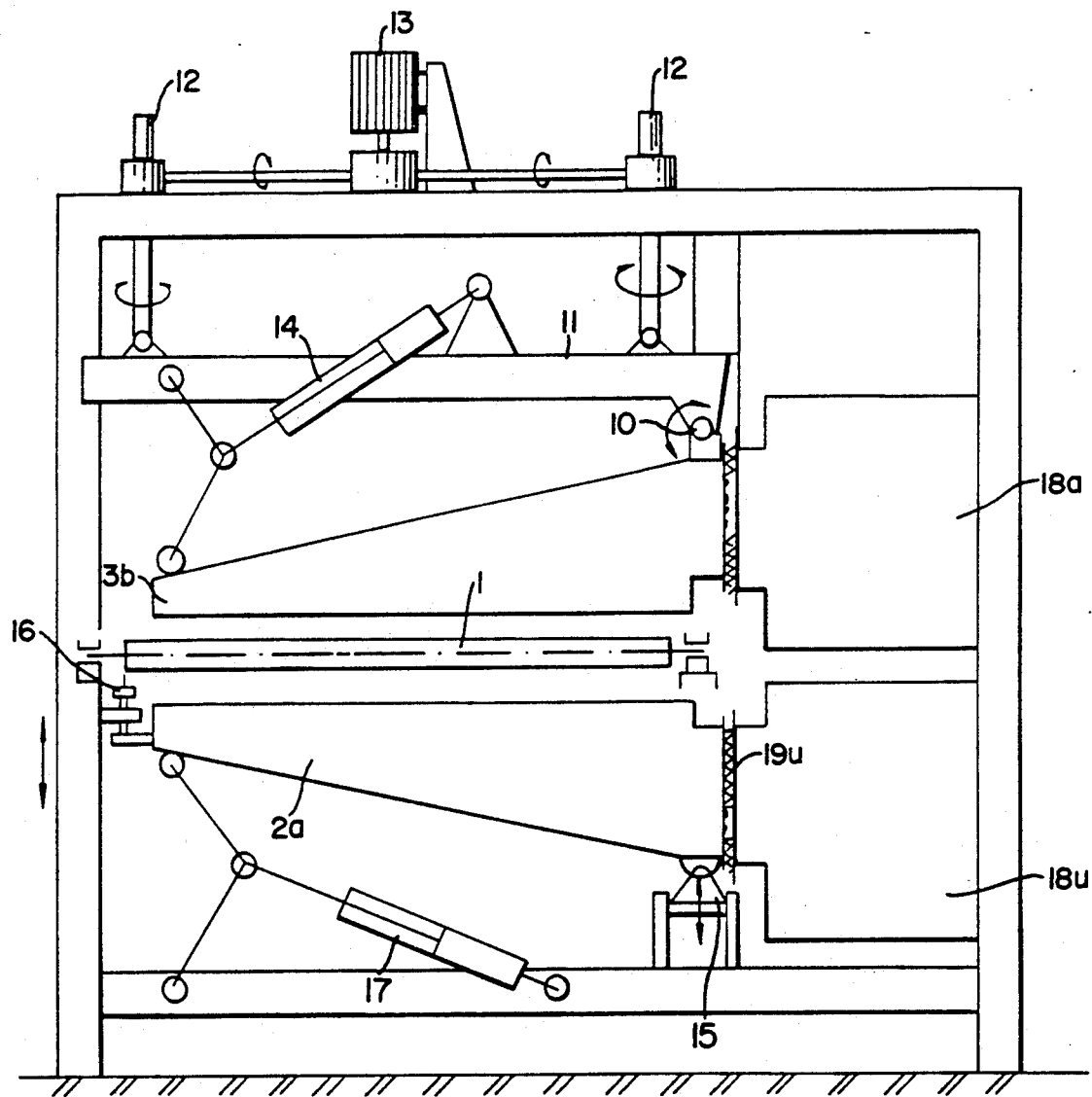
FIG. 3 is a schematic sketch of the cross-section of gas jet cooling section for thermal toughening or tempering of glass sheets or discs.
Figure 4:
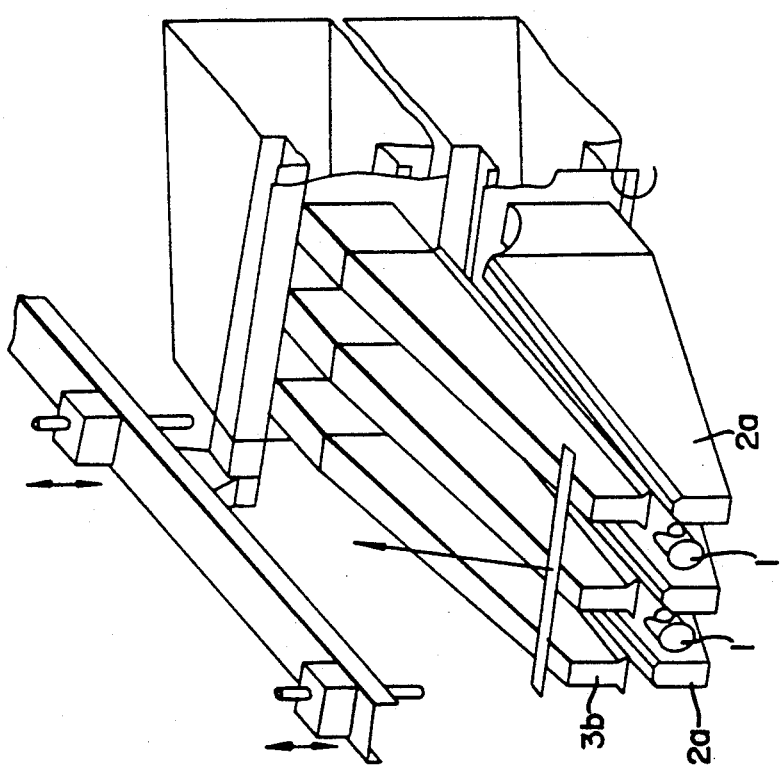
FIG. 4 is a perspective illustration of part of the upper and lower nozzle fields of the gas jet cooling section according to FIG. 3.

A cross-section through a high-convection gas jet nozzle section for thermal tempering of flat glass sheets is shown in FIG. 3. In particular with relatively large operating widths it is expedient to supply the upper and lower nozzle ribs $3b$ and $2a$ via air passages $18o$ and $18u$ to ensure that the air heated by the glass surface can flow off without obstruction perpendicularly upwardly from the glass sheet between the respective nozzle ribs $2a$ and $3b$. This large free space for the flowing away of the air blown onto the glass sheet 7 for the cooling is also shown by the perspective view of FIG. 4, in which the corresponding flow arrows are entered.

As is further apparent from FIG. 3, the upper nozzle group $19o$ or its nozzle ribs $3b$ are pivotally mounted on a frame 11 about a pivot axis 10. The frame 11 can be finely adjusted vertically by means of lifting elements 12 which are mounted on a stationary chassis and actuated by spindles indicated in FIG. 3 by circular arrows by means of an electric motor 13. At the same time, the entire upper nozzle group 3 can be rapidly swung out about the pivot axis 10 by means of a compressed air cylinder 14. This double-action compressed air cylinder 14 effects this pivot movement during normal operation of the nozzle group. Of course, a special arresting means may also be provided and activated by the stroke movement of the compressed air cylinder 14. Such an arresting means is expedient in particular when the nozzle section is to be operated with high pressures.

In similar manner, a pivoting down of the lower nozzle group $19u$ or nozzle ribs $2a$ is possible by means of a compressed air cylinder 17 about a pivot joint 15 which is additionally made vertically adjustable as indicated by the double arrow in FIG. 3. In this case however only a fine adjustment of the height is necessary by means of a stop 16 and the vertically adjustable pivot joint 15 because the distance of the lower nozzles from the lower side of the glass sheet 7 depends only on the position of the lower nozzle ribs $2a$ with respect to the rollers 1 and is the same for all glass thicknesses.

On upward pivoting of the upper nozzle field 3, $19o$ by means of the compressed air cylinder and on downward pivoting of the lower nozzle field 2, $19u$ by means of the compressed air cylinder 17, the sealing surface of the upper nozzle field 3, $19o$ and the sealing surface of the lower nozzle field 2, $19u$ lie free opposite the air supply boxes $18o$, $18u$ so that vertical adjustment is possible without impairing said sealing. The section shown in FIG. 3 is suitable for automation if corresponding computer-controlled motors and displacement pickups are installed.

The distance 5, 6 of the upper nozzle field $19o$ and the lower nozzle field $19u$ from the roller group surface can be adjusted in the manner described in dependence upon the particular operating condition requirements. As a rule, it may be assumed that the distance of the upper nozzle ribs $3b$ from the upper side of the glass sheet 7 should be twice as great at the distance of the lower nozzle ribs $2a$ from the lower side of the glass sheet.

This leads all together to the desired state, i.e. that the nozzle pressures for the upper and lower nozzle fields 2, $19u$ and 3, $19o$ are at least approximately equal.

The essential requirement of thermally tempered or prestressed single-pane safety glass, apart from satisfactory optical properties, ensured by good planarity and faultless surface, is the achieving of a fracture pattern which complies with the relevant regulations and depends firstly on the magnitude of the prestressing achieved by the abrupt cooling operation and secondly on the distribution of the said prestressing, since the propagation of fracture lines is in accordance with the stress distribution in the glass, cf. German patent 2,827,757, and consequently the break pattern can be favourably influenced by appropriate gradation of the stress.

Such a stress influencing is possible for example by changing the cooling, as has been practiced for a long time for coarse grain vision fields of windscreens of single-pane safety glass for automobiles using a coarsened nozzle field.

However, locally different coolings have an effect on the stress distribution in the glass sheet only if the surface of the latter has not yet solidified. This can be achieved in the apparatus according to FIGS. 1 to 4 by means of a sheet movement following the travel/time rule illustrated in FIG. 5. In this diagram, the time is plotted along the Y axis, i.e. the time during the cooling, and on the X axis the travel, i.e. the change of position of the leading edge of a glass sheet disposed on the cooling section, the length of which is also apparent from FIG. 5.

Beneath the X axis the sheet length and thus the position of the leading edge of the sheet at the start of the first reverse stroke is indicated.

As is apparent from this diagram, the sheet 7 is firstly introduced very rapidly into the cooling section until its leading edge has reached the position indicated. In this position the sheet is stopped for a short time before the first reverse stroke starts in which the sheet is moved back somewhat oppositely to the original movement direction. This reverse stroke is a multiple of the nozzle pitch T, thereby changing the prestressing in the glass corresponding to the nozzle or roller pitch T.

Figure 5:
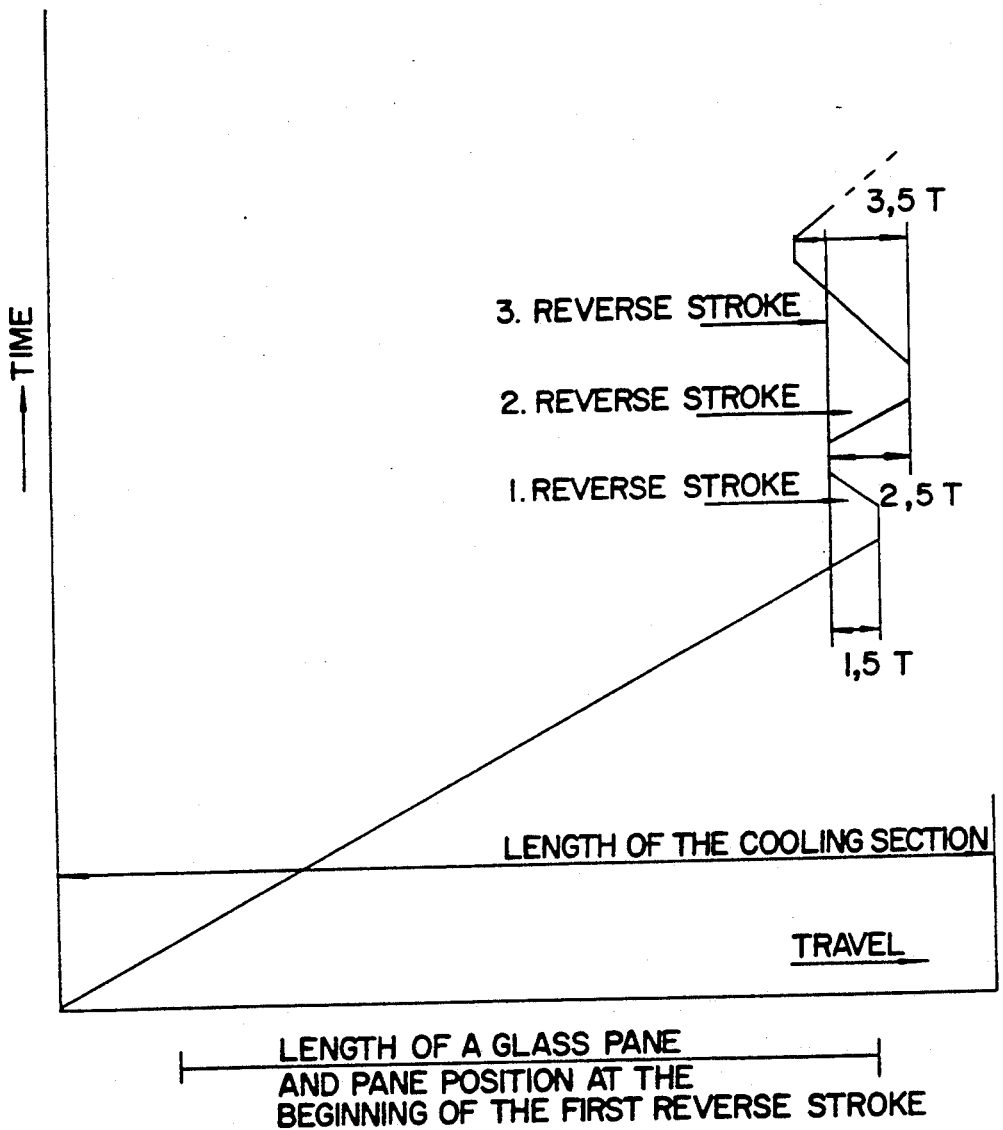
FIG. 5 shows a schematic distance/time diagram for the movement sequence of a glass sheet in a tempering section according to FIGS. 3 and 4.

In the movement sequence shown in FIG. 5 the reverse stroke is 1.5 times the nozzle pitch T.

The glass sheet then remains for a short time in this position before the second reverse stroke starts in the opposite direction, being over the distance 2.5 T. The sheet then remains again for a short time in this new position before the third reverse stroke opposite to the entry direction and with the length 3.5 T starts. Further reverse strokes may follow this if necessary.

The length of the splines can be reduced by making the strip-like different cooling generated on reversing finer by conducting the reversing with travels of the odd multiple of half the pitch. This can also be combined with the change of the magnitude of the reverse travel from stroke to stroke shown in FIG. 5.

In addition to the steps described above the heat transfer can be reduced in the passage direction of the tempering section, for example by reducing the nozzle area or the nozzle pressure reduced as a whole synchronously with the entry of the sheet.

This reduction of the nozzle pressure can for example be achieved by reducing the speed of rotation of the fan/fans (not shown) supplying the nozzle field or fields. Alternatively, the flow can be individually throttled on entry into the nozzle ribs and the nozzle pressure thereby reduced.

Utilizing the same adjustment possibilities the gas pressure can be reduced both in the upper and in the lower nozzle ribs of the two nozzle fields in the passage direction of the glass sheet from nozzle rib to nozzle rib.

Figure 6:
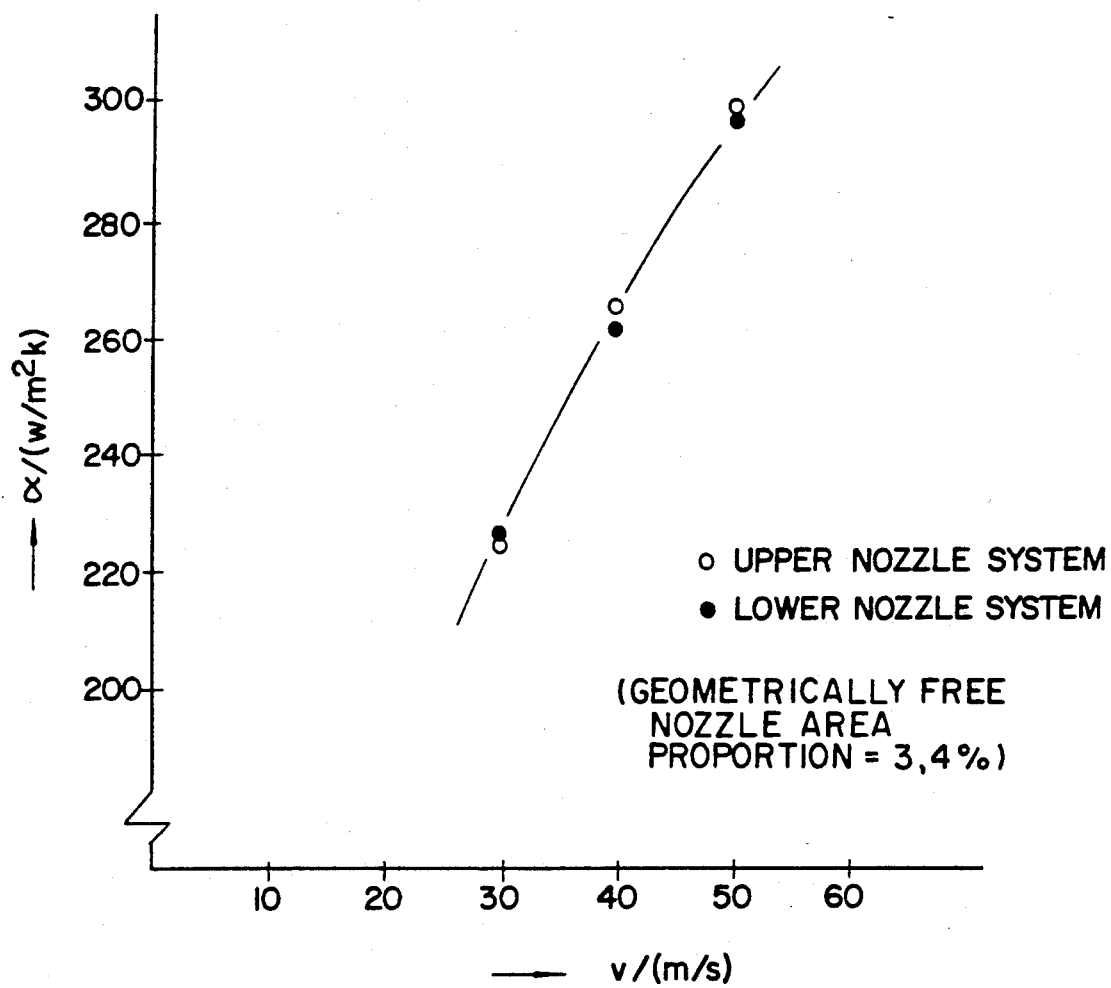
FIG. 6 is a graph in which for the nozzle system of FIG. 1 the heat transfer coefficient for the upper and lower nozzle system is plotted against the transport velocity v of the glass sheet.

Finally, FIG. 6 shows in a graphical illustration the dependence of the heat transfer coefficient α for the upper nozzle system and the lower nozzle system on the velocity v of the traversing glass sheet 7. In both cases, i.e. at the top and bottom, the geometrically free nozzle area proportion is 3.4%.

As is apparent, the measuring points for the heat transfer coefficient α in the upper and lower nozzle systems are practically identical, i.e. there is no measurable difference at the upper and lower sides of the glass sheet. Such a profile is obtainable with the hitherto usual techniques only with an extremely high expenditure.

We claim:

1. A high-convection gas jet nozzle section for blowing gas against sheet-like material guided over rollers, comprising:
    (a) a lower nozzle field having a plurality of nozzle ribs parallel to each other and to the glass guiding rollers, each of said lower nozzle ribs being located between a pair of rollers and provided with a plurality of nozzle apertures,
    (b) an upper nozzle field having a plurality of nozzle ribs with each of said upper nozzle ribs vertically aligned with a vertical axis of an opposed lower nozzle rib and provided with nozzle apertures arranged symmetrically relative to said vertical axis of said opposed lower nozzle rib,
    (c) a bottom of each of said upper nozzle ribs comprising a center strip parallel to and traversing a width of said material, an upwardly inclined strip adjacent each side of said center strip and a downwardly inclined leg at one side of each upwardly inclined strip opposite from said center strip,
    (d) a width of said bottom of each of said upper nozzle ribs in the direction of movement of said material on said rollers is greater than the horizontal distance between said rollers and less than the roller pitch,
    (e) said center strip and said upwardly inclined strips of each of said upper nozzle ribs are provided with nozzle apertures directing gas jets to impinge vertically and obliquely on an upper surface of said material, and
    (f) said upper nozzle ribs are spaced a distance from the upper surface of said material that is greater than the minimum distance said lower nozzle ribs are spaced from the lower surface of said material.

2. A high-convection gas jet nozzle section according to claim 1, wherein said sheet-like material is comprised of thin flat glass sheets, and including means for blowing gas through said nozzle apertures against said flat glass sheets.

3. A high-convection gas jet nozzle section for tempering flat glass sheets guided over rollers, comprising:
    (a) a lower nozzle field having a plurality of nozzle ribs parallel to each other and to the glass guiding rollers, each of said lower nozzle ribs being located between a pair of rollers and provided with a plurality of nozzle apertures,
    (b) an upper nozzle field having a plurality of nozzle ribs with each of said upper nozzle ribs vertically aligned with a vertical axis of an opposed lower nozzle rib and provided with nozzle apertures arranged symmetrically relative to said vertical axis of said opposed lower nozzle rib,
    (c) a bottom of each of said upper nozzle ribs comprising a center strip parallel to and traversing a width of one of said glass sheets, an upwardly inclined strip adjacent each side of said center strip and a downwardly inclined leg at one side of each upwardly inclined strip opposite from said center strip,
    (d) a width of said bottom of each of said upper nozzle ribs in the direction of movement of said glass sheets on said rollers is greater than the horizontal distance between said rollers and less than the roller pitch,
    (e) said center strip and said upwardly inclined strips of each of said upper nozzle ribs are provided with nozzle apertures directing gas jets to impinge vertically and obliquely on an upper surface of said glass sheets, and
    (f) said upper nozzle ribs are spaced a distance from the upper surface of said glass sheets that is greater than the minimum distance said lower nozzle ribs are spaced from the lower surface of said glass sheets.

4. A high-convection gas jet nozzle section according to claim 3, wherein said upper nozzle ribs and said bottoms of said upper nozzle ribs satisfy each of the following dimensional relationships:

a width BP of the center strip relative to a total width BV of each lower nozzle rib is in the following range:

$$0.5 \, BU < BP < 0.75 \, BU;$$

an angle of inclination of each of said upwardly inclined strips relative to said center strip is between 5° and 10°;

a width BK of each of the upwardly inclined strips relative to said total width BU of each lower nozzle rib is:

$$0.6 \, BU < BK < 0.9 \, BU;$$

an angle of inclination of each of said downwardly inclined legs or said upper nozzle rib bottoms relative to a horizontal plane is between 40° and 50°; and a width BR of each of the downwardly inclined legs relative to said total width BU of each lower nozzle rib is:

$$0.1 \, BU < BR < 0.25 \, BU.$$

5. A high-convection gas jet nozzle according to claim 3, wherein an odd number of rows of nozzle apertures of relatively small diameter and hole pitch are provided lengthwise in said center strip of each upper nozzle rib, said rows of said nozzle apertures in said center strip are spaced apart a distance of about one hole pitch and said nozzle apertures are offset with respect to each other in adjacent rows by one-half a hole pitch in a longitudinal direction, additional rows of nozzled apertures of larger diameter and greater hole pitch are provided in each of said upwardly inclined strips at each side of said center strip, and at least one of the diameters and the hole pitch of the nozzle apertures in said upwardly inclined strips increase from said center strip outwardly with the ordinal number of the rows of nozzle apertures.

6. A high-convection gas jet nozzle section according to claim 3, wherein three rows of nozzle apertures are provided in the center strip of the bottom of each upper nozzle rib, two rows of nozzle apertures are provided in each of the adjoining upwardly inclined strips, and the pitch of the nozzle apertures in the upwardly inclined strips is twice the pitch of the nozzle apertures in the center strip.

7. A high-convection gas jet nozzle according to claim 3, wherein the position, diameter and angle of inclination of said nozzle apertures provided to one of said upper and lower nozzle ribs are selected to generate a gas jet impact pattern on one side of said glass sheets which is a mirror image of the gas jet impact pattern generated on the opposite side of said glass sheets by the other one of said upper and lower nozzle ribs.

8. A high-convection gas jet nozzle section according to claim 3, wherein a geometrical nozzle exit area of the nozzle apertures on one side of a glass sheet is from about 2% to about 5% of a blasted area of a glass sheet and the nozzle exit area is the same for the nozzle apertures in the upper and lower nozzle ribs.

9. A high-convection gas jet nozzle section according to claim 3, wherein a percentage of the nozzle exit area of the nozzle apertures relative to a blasted area of a glass sheet decreases in the direction of movement of the glass sheet relative to the nozzle section.

10. A high-convection gas jet nozzle section according to claim 3, wherein the pitch of the rollers and nozzle ribs is in a range of from about 60 mm to about 150 mm.

11. A high-convection gas jet nozzle section according to claim 3, wherein a cross-section of the lower nozzle ribs is in the form of a hipped roof having a horizontal area and adjoining downwardly inclined areas and both of the inclined areas and the horizontal area are provided with nozzle apertures.

12. A high-convection gas jet nozzle section according to claim 3 and including means mounting said upper nozzle field above said rollers for guiding glass sheets and means mounting said lower nozzle field below said rollers, means for adjusting the distance between said upper nozzle field and said rollers and means for adjusting the distance between said lower nozzle field and said rollers.

13. A high-convection gas jet nozzle section according to claim 3, wherein the upper nozzle field is spaced a distance from the flat glass sheets about twice as great as the distance the lower nozzle field is spaced from the flat glass sheets.

14. A high-convection gas jet nozzle section according to claim 3, and including means for blowing gas through said nozzle apertures with the nozzle aperture pressures for the upper nozzle field and the nozzle aperture pressures for the lower nozzle field approximately equal.

15. A high-convection gas jet nozzle section according to claim 3, and including means for blowing gas through said nozzle apertures under pressure with the gas pressure decreasing in the direction of movement of the glass sheets from nozzle rib to nozzle rib in the upper nozzle field and in the lower nozzle field.

16. A high-convection gas jet nozzle section according to claim 15, and including means for individually throttling the flow of gas under pressure at an entrance to the nozzle ribs.

17. A high-convection gas jet nozzle section according to claim 3, and further including:

a frame mounted for vertical movement by a plurality of lifting spindles, a lifting spindle drive, means mounting said plurality of nozzle ribs of said upper nozzle field to said frame for pivotal movement relative to said frame, a pneumatic cylinder operatively connected between said frame and said nozzle ribs of said upper nozzle field to selectively pivot said nozzle ribs of said upper nozzle field as a unit relative to said frame, means mounting said plurality of nozzle ribs of said lower nozzle field to a vertically adjustable support for pivotal movement relative to said support, a pneumatic cylinder operatively connected between said support and said nozzle ribs of said lower nozzle field to selectively pivot said nozzle ribs of said lower nozzle field as a unit relative to said support, and a vertically adjustable stop member limiting upward movement of an end or said nozzle ribs of said lower nozzle field distant from said pivotal mounting means.

18. A high-convection gas jet nozzle section according to claim 17, wherein displacement pickups are provided for determining the extent of vertical movement of said frame and said lifting spindle drive is a computer controlled motor.

19. A high-convection gas jet nozzle section according to claim 3, wherein the rollers for guiding the glass sheets are provided with spaced annular supports for the glass sheets and said annular supports for each roller cover only a smaller part of the surface area of each respective roller.

20. A high-convection gas jet nozzle section according to claim 19, wherein said annular supports are comprised of O-rings formed of a fluorine rubber.

21. A high-convection gas jet nozzle section according to claim 19, wherein said annular supports are comprised of a silicone fibrous material in combination with a binder.

22. A method of tempering flat glass sheets wherein heated glass sheets are guided over rollers into a high-convection gas jet nozzle section including:
   (a) a lower nozzle field having a plurality of nozzle ribs parallel to each other and to the glass guiding rollers, each of said lower nozzle ribs being located between a pair of rollers and provided with a plurality of nozzle apertures,
   (b) an upper nozzle field having a plurality of nozzle ribs with each of said upper nozzle ribs vertically aligned with a vertical axis of an opposed lower nozzle rib and provided with nozzle apertures arranged symmetrically relative to said vertical axis of said opposed lower nozzle rib,
   (c) a bottom of each of said upper nozzle ribs comprising a center strip parallel to and traversing a width of one of said glass sheets, and upwardly inclined strip adjacent each side of said center strip and a downwardly inclined leg at one side of each upwardly inclined strip opposite from said center strip,
   (d) a width of said bottom of each of said upper nozzle ribs in the direction of movement of said glass sheets on said rollers is greater than the horizontal distance between said rollers and less than the roller pitch,
   (e) said center strip and said upwardly inclined strips of each of said upper nozzle ribs are provided with nozzle apertures directing gas jets to impinge vertically and obliquely on an upper surface of said glass sheets,
   (f) said upper nozzle ribs are spaced a distance from the upper surface of said glass sheets that is greater than the minimum distance said lower nozzle ribs are spaced from the lower surface of said glass sheets, and
   (g) means for blowing gas through said nozzle apertures under pressure; comprising the steps of:
   blowing gas through said nozzle aperture at a first pressure,
   moving each glass sheet into said high-convection gas jet nozzle section, and
   blowing gas through said nozzle apertures at a reduced pressure after starting to move each glass sheet into said high-convection gas jet nozzle section.

23. The method of tempering flat glass sheets as defined by claim 22, wherein said means for blowing gas through said nozzle apertures is a rotating fan and including the step of reducing a speed of rotation of said fan to blow gas through said nozzle apertures at said reduced pressure.

24. A method of tempering flat glass sheets wherein heated glass sheets are guided over rollers into a high-convection gas jet nozzle section including:
   (a) a lower nozzle field having a plurality of nozzle ribs parallel to each other and to the glass guiding rollers, each of said lower nozzle ribs being located between a pair of rollers and provided with a plurality of nozzle apertures,
   (b) an upper nozzle field having a plurality of nozzle ribs with each of said upper nozzle ribs vertically aligned with a vertical axis of an opposed lower nozzle rib and provided with nozzle apertures arranged symmetrically relative to said vertical axis of said opposed lower nozzle rib,
   (c) a bottom of each of said upper nozzle ribs comprising a center strip parallel to and traversing a width of one of said glass sheets, an upwardly inclined strip adjacent each side of said center strip and a downwardly inclined leg at one side of each upwardly inclined strip opposite from said center strip,
   (d) a width of said bottom of each of said upper nozzle ribs in the direction of movement of said glass sheets on said rollers is greater than the horizontal distance between said rollers and less than the roller pitch (T),
   (e) said center strip and said upwardly inclined strips of each of said upper nozzle ribs are provided with nozzle apertures directing gas jets to impinge vertically and obliquely on an upper surface of said glass sheets, and
   (f) said upper nozzle ribs are spaced a distance from the upper surface of said glass sheets that is greater than the minimum distance said lower nozzle ribs are spaced from the lower surface of said glass sheets; comprising the steps of:
   moving each glass sheet rapidly in one direction into said high-convection gas jet nozzle section until a forward edge of said glass sheet reaches a predetermined position;
   reversing said movement of said glass sheet at least once with a reverse stroke of movement representing a multiple of one-half of the roller pitch (T), and
   stopping said movement of said glass sheet for a short time before each reverse stroke of movement.

25. The method of tempering flat glass sheets as defined by claim 24, wherein the length of at least one reverse stroke of movement of each glass sheet is different from the length of another reverse stroke of movement of said glass sheet.

* * * * *

UNITED STATES PATENT AND TRADEMARK OFFICE
CERTIFICATE OF CORRECTION

PATENT NO. : 5,094,678
DATED : March 10, 1992
INVENTOR(S) : Carl KRAMER et al

It is certified that error appears in the above-identified patent and that said Letters Patent is hereby corrected as shown below:

On the cover page, Item [54], third line, "ROLLS" should read -- ROLLERS --.

On the cover page, Item [73], second line, "U" should read -- und --.

On the cover page, Item [73], fourth line, "Aichon" should read -- Aachen --.

Signed and Sealed this

Twenty-fourth Day of August, 1993

Attest:

BRUCE LEHMAN

Attesting Officer

Commissioner of Patents and Trademarks